(12) United States Patent
Kato et al.

(10) Patent No.: US 7,833,687 B2
(45) Date of Patent: Nov. 16, 2010

(54) AQUEOUS DISPERSION OF FINE RESIN PARTICLES, METHOD FOR PRODUCING AQUEOUS DISPERSION OF FINE RESIN PARTICLES, AND METHOD FOR PRODUCING TONER PARTICLES

(75) Inventors: Masayoshi Kato, Tokyo (JP); Takayuki Toyoda, Yokohama (JP); Ryuji Higashi, Kawasaki (JP); Ryo Natori, Yokohama (JP); Takaho Shibata, Tokyo (JP); Yuya Chimoto, Kawasaki (JP); Takeshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/574,217

(22) Filed: Oct. 6, 2009

(65) Prior Publication Data
US 2010/0028794 A1      Feb. 4, 2010

Related U.S. Application Data

(63) Continuation of application No. PCT/JP2009/060307, filed on May 29, 2009.

(30) Foreign Application Priority Data

Jun. 2, 2008      (JP) ............................. 2008-144339

(51) Int. Cl.
*G03G 9/08*      (2006.01)
*C08F 2/22*      (2006.01)

(52) U.S. Cl. .............................. 430/137.19; 430/137.1; 524/458; 524/460; 524/461; 526/201; 526/203; 521/29

(58) Field of Classification Search ................. 524/458, 524/460, 461; 526/201, 203; 521/29; 430/137.1, 430/137.19
See application file for complete search history.

(56) References Cited

U.S. PATENT DOCUMENTS

| 5,270,143 | A |   | 12/1993 | Tomiyama et al. .......... 430/109 |
| 5,319,424 | A |   | 6/1994  | Tomiyama et al. .......... 355/273 |
| 5,369,163 | A | * | 11/1994 | Chiou et al. ................. 524/458 |
| 6,413,691 | B2 |  | 7/2002  | Daimon et al. ........... 430/109.4 |
| 6,582,869 | B2 |  | 6/2003  | Daimon et al. ........... 430/109.4 |

(Continued)

FOREIGN PATENT DOCUMENTS

EP      0 596 138 A1      5/1994

(Continued)

*Primary Examiner*—Hoa V Le
(74) *Attorney, Agent, or Firm*—Fitzpatrick, Cella, Harper & Scinto (57) ABSTRACT

The present invention provides an aqueous dispersion of non-spherical fine resin particles having excellent storage stability and processability such as aggregation and adherence to other substances, a method for producing the aqueous dispersion of fine resin particles, and a method for producing toner particles using the aqueous dispersion of fine resin particles. The present invention relates to an aqueous dispersion of fine resin particles characterized in that the fine resin particles are non-spherical particles with an average minor axis being 0.02 μm or more and 1.00 μm or less and an average ratio of a major axis to a minor axis being 2.0 or more and 5.0 or less, a method for producing the aqueous dispersion of fine resin particles, and a method for producing toner particles using the aqueous dispersion of fine resin particles.

7 Claims, 1 Drawing Sheet

U.S. PATENT DOCUMENTS

| | | | |
|---|---|---|---|
| 2007/0054123 | A1 | 3/2007 | Hasbiba et al. ............. 428/407 |
| 2007/0088119 | A1 | 4/2007 | Kamiyoshi et al. .......... 524/599 |
| 2008/0299482 | A1 | 12/2008 | Kato et al. ................. 430/113 |

FOREIGN PATENT DOCUMENTS

| | | |
|---|---|---|
| JP | 61-058092 | 3/1986 |
| JP | 64-010547 | 1/1989 |
| JP | 05-317688 | 12/1993 |
| JP | 06-053805 | 2/1994 |
| JP | 06-332251 | 12/1994 |
| JP | 08-202074 | 8/1996 |
| JP | 08-245769 | 9/1996 |
| JP | 08-269310 | 10/1996 |
| JP | 10-020552 | 1/1998 |
| JP | 2000-191892 | 7/2000 |
| JP | 2001-305796 | 11/2001 |
| JP | 2002-082485 | 3/2002 |
| JP | 2002-256077 | 9/2002 |
| JP | 2004-287149 | 10/2004 |
| JP | 2007-070372 | 3/2007 |
| JP | 2007-106906 | 4/2007 |

* cited by examiner

Figure 1

AQUEOUS DISPERSION OF FINE RESIN PARTICLES, METHOD FOR PRODUCING AQUEOUS DISPERSION OF FINE RESIN PARTICLES, AND METHOD FOR PRODUCING TONER PARTICLES

This application is a continuation of International Application No. PCT/JP2009/060307, filed May 29, 2009, which claims the benefit of Japanese Patent Application No. 2008-144339, filed Jun. 2, 2008.

BACKGROUND OF THE INVENTION

1. Field of the Invention

The present invention relates to an aqueous dispersion of fine resin particles used in such fields as printing materials for an electrophotographic toner, an ink, and the like, a coating material, an adhesive, a pressure-sensitive adhesive, fiber processing, paper manufacturing and paper processing, and civil engineering, and to a method for producing the aqueous dispersion of fine resin particles. In addition, the present invention relates to a method for producing toner particles using the aqueous dispersion of fine resin particles.

2. Related Background Art

Fine particles with a nonspherical form having a large ratio of a major axis to a minor axis are used as a material expecting potential improvements in various characteristics such as optical properties like light-scattering and light-focusing, friction properties such as sliding, adhesiveness, adherence, material mechanical properties such as impact resistance and tensile strength of an article, matting of a coating material, and shielding properties, in various fields such as an electronic and electric material, an optical material, a printing material, a biological and a medical material, and cosmetics, as a filler and a testing material. Many of widely used fine particles having a large ratio of a major axis to a minor axis are generally formed of inorganic materials such as a metal oxide. Such inorganic materials have larger specific gravity as compared with a resin and are not comfortable with a resin, and thus fine resin particles with a nonspherical form having a large ratio of a major axis to a minor axis are being desired.

To obtain an aqueous dispersion of fine resin particles, a suspension polymerization method, an emulsion polymerization method, a phase-inversion (self) emulsification method, and the like are know as the general methods. However, all of fine particles obtained by these methods are of a spherical form substantially. Fine particles with a high sphericity have drawbacks of too-high fluidity and a too-small surface area, leading to restriction in the processability in processing such as aggregating these fine particles and adhering them to other materials. Accordingly, fine resin particles with a nonspherical form having a large ratio of a major axis to a minor axis are being desired.

Fine resin particles having a large ratio of a major axis to a minor axis may also be produced by a mechanical method involving, for example, melting, spinning, and cutting. In this method, however, to make a particle size in an order of microns is not only technically difficult but also requires time and labor for mass production.

Resin particles having specific forms such as a circular disk and a planular plate, not like amorphous or spherical particles obtained by a pulverization method, a solution polymerization method, and the like, have been developed (refer to, for example, one of Japanese Patent Publication No. H06-53805 and Japanese Patent Application Laid-Open No. H05-317688). However, since these fine particles are in the form of plate, there is a steric limitation too, when they are processed to aggregate by themselves, to adhere to other substances, and the like.

Oval spherical particles of an organic polymer produced by a solution polymerization method are also proposed (refer to, for example, Japanese Patent Application Laid-Open No. 2007-70372), but no particles with a size of 1.0 μm or less is exemplified.

Further, a method for producing an aqueous dispersion of nonspherical fine resin particles by secondary aggregation of fine resin particles obtained by a molten emulsification method is also proposed (refer to, for example, Japanese Patent Application Laid-Open No. H08-269310), but making the ratio of a major axis to a minor axis beyond a certain level is difficult.

Therefore, so far fine resin particles expecting potential improvements in various characteristics as well as having a large ratio of a major axis to a minor axis and a size of sub-microns have not been known yet.

On the other hand, in the field of electrophotographic toner, to provide a production method with a low energy consumption and environmental burden and to supply such goods became a significant social requirement in an industrial sector amid the recent global movement to save energy. In addition, with current rapid diffuse of digitalization technology, needs for a higher quality picture in outputs such as printing and copying are being increased among users each day in an ordinary household, an office, and a publishing sector. In order to meet the need for a higher quality picture, improvement of a resolution power by making a particle diameter of toner smaller is one important technical approach especially in toners used for an electrophotographic picture. Presently, the weight-average particle diameter of toner particles can be made small in the order of 5 μm. However, in order to produce toners having the weight-average particle diameter of 6 μm or less while controlling the particle size distribution well, it is difficult to address the issues of production energy and cost by a conventionally used kneading-pulverization method. Accordingly, so-called chemical production methods, which can easily control a particle size distribution and a particle diameter of toners, such as a suspension polymerization method, a dissolution suspension method, and an emulsion aggregation method have also been used presently as the toner-production methods. Among them, an emulsion aggregation method draws an attention because the method can control a form and a dispersibility of particles intentionally.

One method for producing an aqueous dispersion of fine resin particles used in an emulsion aggregation method and the like is an emulsion polymerization method. In the emulsion polymerization method, a monomer is dispersed in water or a poor solvent to form an O/W emulsion, and a group of the dispersed monomer particles is polymerized by a radical polymerization to form an aqueous dispersion of fine resin particles. Accordingly, the emulsion polymerization method has been a method for producing an aqueous dispersion of fine resin particles applicable only to monomers which are polymerizable by a radical polymerization (for example, styrenic monomers, acrylic monomers and vinyl monomers). For this reason, an aqueous dispersion of fine resin particles obtainable by the emulsion polymerization has been limited to certain resins.

A dispersion granulation method may be cited as another method for producing an aqueous dispersion of fine resin particles. For example, a phase inversion emulsification method is one of such dispersion granulation methods. Specifically, a method in which a resin solution formed of a polyester resin having a neutralized salt structure dissolved in a water-miscible organic solvent is added by an aqueous medium to cause a phase-inversion emulsification and then the organic solvent is removed is known (refer to, for example, Japanese Patent Publication No. S61-58092 and Japanese Patent Publication No. S64-10547). However, in this phase inversion emulsification method, it is difficult to remove the organic solvent used in the production completely from the aqueous dispersion of fine resin particles. Even if the removal could be done, it may not only lead to a complicated production process and a high production cost but also risk to form fine resin particles with inhomogeneous sizes.

Further, a method for producing an aqueous dispersion of a polyester resin without using an organic solvent is known. For example, an aqueous dispersion of fine resin particles is obtained by a method in which a self-emulsifying thermoplastic resin is pressurized in an aqueous alkaline solution and heated at a temperature higher than a melting point of the resin for emulsification (refer to, for example, Japanese Patent Application Laid-Open No. H08-245769, Japanese Patent Application Laid-Open No. 2001-305796, Japanese Patent Application Laid-Open No. 2002-82485, and Japanese Patent Application Laid-Open No. 2004-287149). However, in this method for producing an aqueous dispersion of a polyester resin without using an organic solvent, a self-emulsifying resin like a specific polyester resin containing a sulfone group must be used. In addition, since the self-emulsifying resins have many dissociable terminal groups in themselves, when used, for example, as an electrophotographic toner, there is a risk of decreasing in its hydrophobicity and thereby decreasing such properties as an anti-static property and a water-adsorption.

In addition, a method for producing an aqueous dispersion of fine resin particles in which a resin melted at high temperature is mixed with an aqueous medium containing a neutralizing agent under high pressure and then the resulting mixture is applied with a shear force is known (refer to, for example, Japanese Patent Application Laid-Open No. 2000-191892 and Japanese Patent Application Laid-Open No. 2002-256077). However, in this method for producing an aqueous dispersion of fine resin particles by applying a shear force, a dispersant such as a surfactant is not contained basically, and thus a protection power (stereoscopic masking power) of fine resin particles thereby formed is weak. Accordingly, emulsification under pressure with heating is prone to cause coalescence among particles, and thereby likely to cause problems of forming undesired particle diameters and a broad particle size distribution easily.

SUMMARY OF THE INVENTION

It is an objection of the present invention to solve the problems in conventional technologies as mentioned above, namely to provide an aqueous dispersion of nonspherical fine resin particles having excellent storage stability and processability such as aggregation and adherence to other substances.

It is an object of the present invention to provide a method for producing the aqueous dispersion of nonspherical fine resin particles.

Further, it is an object of the present invention to provide a method for producing toner particles using the aqueous dispersion of nonspherical fine resin particles.

The present invention relates to an aqueous dispersion of fine resin particles including fine resin particles containing an acid group-containing resin and an aqueous medium, characterized in that the fine resin particles are nonspherical particles with an average minor axis being 0.02 μm or more and 1.00 μm or less and an average ratio of a major axis to a minor axis being 2.0 or more and 5.0 or less.

In addition, the present invention relates to a method for producing an aqueous dispersion of fine resin particles including at least (1) mixing an aqueous medium, an acid group-containing resin, a basic substance, and a surfactant to obtain a mixture, (2) emulsifying the mixture by applying a shear force with heating the mixture at a temperature of 10° C. or higher relative to a softening temperature (Tm) of the acid group-containing resin to form an emulsified mixture, and (3) cooling the emulsified mixture, characterized in that the cooling is done, with applying a shear force, at the cooling rate of 0.5° C./minute or faster and 10° C./minute or slower till a glass transition temperature (Tg) of the acid group-containing resin or lower, and the obtained aqueous dispersion of fine resin particles is the aqueous dispersion of fine resin particles as mentioned above.

Further, the present invention relates to a method for producing toner particles including at least aggregating to form aggregates by mixing at least an aqueous dispersion of fine resin particles and a colorant thereby aggregating the fine resin particles and the colorant in an aqueous medium and fusing the aggregates by heating to obtain toner particles, characterized in that the aqueous dispersion of fine resin particles is the aqueous dispersion of fine resin particles as mentioned above.

An aqueous dispersion of fine resin particles in the present invention has excellent storage stability and processability such as aggregation and adherence to other substances, because the aqueous dispersion of fine resin particles as mentioned above is characterized in that the fine resin particles are nonspherical particles with an average minor axis being 0.2 μm or less and 1.00 μm or more and an average ratio of a major axis to a minor axis being 2.0 or more and 5.0 or less.

In addition, the present invention may provide an aqueous dispersion of fine resin particles containing a small amount of surfactant.

Further, when toner particles are produced by aggregating and fusing at least an aqueous dispersion of fine resin particles of the present invention, washing to remove a surfactant may become easier. In addition, since nonspherical particles are aggregated, it may be expected such an effect that other particles such as a colorant and a releasing material are included more easily as compared with spherical particles.

Further features of the present invention will become apparent from the following description of exemplary embodiments with reference to the attached drawings.

DETAILED DESCRIPTION OF THE INVENTION

An aqueous dispersion of fine resin particles in the present invention can be the aqueous dispersion of fine resin particles including fine resin particles containing an acid group-containing resin and an aqueous medium, characterized in that fine resin particles are nonspherical particles with an average minor axis being 0.02 μm or more and 1.00 μm or less and an average ratio of a major axis to a minor axis being 2.0 or more and 5.0 or less.

Within the above-mentioned range, excellent effects in processability such as aggregation and adherence to other substances may be expressed.

Although an average minor axis is 0.02 μm or more and 1.00 μm or less, the average minor axis can be in the range of 0.02 μm or more and 0.40 μm or less. To make the average minor axis below 0.02 μm is technically difficult. When the average minor axis is over 1.00 μm, storage stability of the fine resin particles is poor, leading to easy separation by sedimentation. In addition, when used to produce toners by an emulsion aggregation method, given toner diameter of generally 3 to 7 μm, presence of a large amount of particles with an average minor axis being 1.00 μm or more is not desirable in view of keeping homogeneity of the toner composition. Accordingly, from a viewpoint of producing toners by an emulsion polymerization, the average minor axis can be 0.40 μm or less.

The average ratio of a major axis to a minor axis is 2.0 or more and 5.0 or less, while the average ratio can be in a range between 2.5 to 4.0. To make the average over 5.0 is technically difficult, and also not desirable for the reasons as mentioned above because of a longer major axis.

For a similar reason, amount of the particles with the ratio of a major axis to a minor axis being less than 1.5 is preferably 10% or less and more preferably 5% or less, relative to the total amount.

Similarly, a 50%-particle diameter based on volume distribution of the fine resin particles is preferably 0.02 μm or more and 1.00 μm or less, and more preferably 0.02 μm or more and 0.40 μm or less.

In the present invention, the major axis and the minor axis of fine resin particles are measured, after an aqueous dispersion of fine resin particles is diluted by an ion-exchanged water and then dried by an air, by using a picture with measurable magnifications (10,000 to 50,000 magnifications) taken by an electron microscope (for example, a scanning electron microscope S-4800, manufactured by Hitachi High-Technologies Corp.; hereinafter referred to as SEM). Here, the major axis is the length of a long side of a rectangle which is drawn so as to give the smallest area made by a line along outer circumference of a particle and the minor axis is the length of a short side of the rectangle. The average of the major axis and of the minor axis is the average of 50 or more of measurable particles randomly chosen in an SEM picture. The measurable particles in an SEM picture is meant by the particles with a minor axis of 0.01 μm or more in the case of 10,000 magnifications by an SEM picture.

In the present invention, a 50%-particle diameter based on the volume distribution of fine resin particles is the particle diameter (median diameter) corresponding to 50% accumulation of the particle size distribution measured by a laser diffraction/scattering particle size distribution measurement instrument (LA-920, manufactured by HORIBA, Ltd.), and is specifically the particle diameter (median diameter) corresponding to 50% accumulation of the measured particle size distribution in terms of volume distribution for the sample for measurement (aqueous dispersion of fine resin particles) prepared so as to give a transmittance within a measurable range (70 to 95%) at a sample charging point of the measurement instrument by following an operation manual of the measurement instrument.

A method for producing an aqueous dispersion of fine resin particles in the present invention includes mixing an aqueous medium, an acid group-containing resin, a basic substance, and a surfactant to obtain a mixture, emulsifying the mixture by applying a shear force with heating the mixture at a temperature of 10° C. or higher relative to the softening temperature (Tm) of the acid group-containing resin to form an emulsified mixture, and cooling the emulsified mixture to obtain the aqueous dispersion of fine resin particles, and is characterized in that the cooling is done, with applying a shear force, at the cooling rate of 0.5° C./minute or faster and 10° C./minute or slower till a glass transition temperature (Tg) of the acid group-containing resin or lower.

Materials to be used to obtain an aqueous dispersion of fine resin particles in the present invention will be described.

<Acid Group-Containing Resins>

An acid group-containing resin is the resin containing a carboxyl group or a sulfonic acid group in at least any one of its molecular terminal and its side chain. A suitable resin to be used for production of a toner from an aqueous dispersion of fine resin particles of the present invention can be an acrylic resin, a methacrylic resin, a styrene-acrylic copolymer, a styrene-methacrylic copolymer, styrene-acrylic-methacrylic copolymer, or a polyester resin. Among them, a polyester resin having a small difference between a softening temperature (Tm) and a glass transition temperature (Tg) can be particularly used for a toner.

A softening temperature (Tm) of the acid group-containing resin is measured by a flow tester (CFT-500D, manufactured by Shimadzu Corp.) Specifically, 1.5 g of weighed sample is measured in a die with a height of 1.0 mm and a diameter of 1.0 mm under conditions of a heating rate of 4.0° C./minute, a pre-heating time of 300 seconds, a load of 5 kg, and a measurement temperature range of 60 to 200° C. The temperature at which one half of the sample is flowed out is taken as the softening temperature (Tm).

The softening temperature (Tm) of the acid group-containing resin can be 90° C. or higher and 150° C. or lower. Namely, when used for an electrophotographic toner, the temperature can be 150° C. or lower in view of a fixing property, and 90° C. or higher in view of a heat resistance under storage.

The acid group-containing resin can have the following physical properties in view of toner's heat resistance, fixing property, anti-offsets (suppression of a high-temperature offset and a low-temperature offset), and expansion of a non-offset temperature range: (1) Glass transition temperature (Tg): 50 to 70° C., (2) Number-average molecular weight: 1,000 to 50,000, preferably 3,000 to 20,000, and (3) Molecular weight distribution (Mw/Mn) expressed by the ratio of the number-average molecular weight (Mn) to the weight-average molecular weight (Mw): 2 to 60.

Here, the glass transition temperature (Tg) is a physical value measured according to JIS K7121, meaning the middle point glass transition temperature described in the standard.

The mass ratio of the fine resin particles to the total mass of the aqueous medium and the fine resin particles (mass of the fine resin particles/total mass of the aqueous medium and the fine resin particles) is preferably 0.20 or more and less than 0.60, and more preferably 0.25 or more and less than 0.60.

Higher the mass ratio of the resin to the aqueous medium, the smaller the diameter of the fine resin particles, and thus the concentration of a surfactant may be lowered. However, production of a dispersion of fine resin particles is difficult if the ratio is 0.60 or more, because viscosity of the aqueous dispersion increases.

<Surfactants>

Examples of the surfactants include anionic surfactants such as a sulfate ester salt, a sulfonic acid salt, a phosphate ester, and a soap; cationic surfactants such as an amine salt and a quaternary ammonium salt; and nonionic surfactants such as a polyethylene glycol, an alkylphenol ethylene oxide adduct, and a polyalcohol. Among them, there can be used at least any one of surfactants belonging to the nonionic surfactant and the anionic surfactant. The above-mentioned surfactants may be used singly or in a combination of two or more kinds, and concurrent use of a nonionic surfactant and an anionic surfactant may also be allowed. Concentration of the above-mentioned surfactant in an aqueous medium can be 0.5 to 5% by mass.

<Basic Substances>

Pulverizing an acid group-containing resin as it is in an aqueous medium sometimes results in pH of 3 to 4, or too acidic, so there may be a case where a crystalline polyester resin is hydrolyzed, if the crystalline polyester resin or the like is present, for example. However, in the presence of a basic substance, the aqueous dispersion may be made not easily become acidic during emulsification so that, even if the acid group-containing resin is pulverized in an aqueous medium, the aqueous dispersion of fine resin particles may be obtained without the resin being hydrolyzed.

Examples of the basic substances include inorganic bases such as ammonia, sodium hydroxide, potassium hydroxide, sodium carbonate, potassium carbonate, sodium bicarbonate, and potassium bicarbonate, and organic bases such as dimethyl amine, diethyl amine, and triethyl amine. Among them, weak bases like amines such as dimethyl amine and triethyl amine can be used because hydrolysis may not take place by them.

The adding amount of the basic substance can be appropriately controlled so as to make a pH near neutral during emulsification. Increase in the adding amount of the basic substance has a tendency to make a diameter of fine resin particles smaller. When a strong base is used as the basic substance, the adding amount needs to be controlled so as not to induce the hydrolysis.

Then, a method for producing an aqueous dispersion of fine resin particles will be described.

A method of the present invention includes mixing an aqueous medium, an acid group-containing resin, a basic substance, and a surfactant to obtain a mixture, emulsifying the mixture by applying a shear force with heating the mixture at a temperature of 10° C. or higher relative to the softening temperature (Tm) of the acid group-containing resin to form an emulsified mixture, and cooling the emulsified mixture to obtain an aqueous dispersion of fine resin particles. Specifically, an acid group-containing resin is added into a sealing pressurizable vessel containing a surfactant and a basic substance in an aqueous medium, and they are mixed. Then, the resin is dispersed under melted condition by applying a shear force under sealing pressure with heating the mixture at a temperature of 10° C. or higher relative to a softening temperature (Tm) of the resin to form an emulsified mixture. Thereafter, the emulsified mixture obtained is cooled with applying a shear force at the cooling rate of 0.5° C./minute or faster and 10° C./minute or slower till a glass transition temperature (Tg) of the resin or lower to obtain an aqueous dispersion of fine resin particles.

The emulsification as mentioned above is carried out by applying a shear force with heating at a temperature higher, preferably by 10 to 100° C. (more preferably by 15 to 50° C.), relative to a softening temperature (Tm) of an acid group-containing resin.

When the difference between the heating temperature and the softening temperature (Tm) of an acid group-containing resin during the emulsification is below 10° C., softening of the resin is too insufficient to obtain an emulsified mixture. Accordingly, the heating temperature during the emulsification was made 10° C. or higher relative to the softening temperature (Tm) of an acid group-containing resin. In order to obtain a stable emulsified mixture, a shear force can be applied with heating at the temperature of 15° C. or higher relative to the softening temperature (Tm) of an acid group-containing resin during the emulsification.

On the other hand, in order to prevent thermal decomposition of the resin from occurring, the heating temperature during the emulsification is preferably not higher than 100° C., and more preferably not higher than 50° C. relative to the softening temperature (Tm) of an acid group-containing resin.

As shown above, in the present invention the softening temperature of an acid group-containing resin can be 90° C. or higher, and thus the heating temperature can be 100° C. or higher. Accordingly, the dispersion is made preferably under a pressurized condition (more preferably 0.11 MPa or higher and 4.00 MPa or lower, particularly preferably 0.11 MPa or higher and 1.60 MPa or lower) in a sealing pressurizable vessel.

If the time of heating under pressurized condition is too short, it is difficult to obtain an emulsified mixture with a sharp particle size distribution, and thus the time is preferably 10 minutes or longer, and more preferably 20 minutes or longer.

The cooling rate with applying a shear force to cool the emulsified mixture till a grass transition temperature (Tg) or lower of an acid group-containing resin is 0.5° C./minute or faster and 10° C./minute or slower.

The cooling rate is more preferably 0.5° C./minute or faster and 5° C./minute or slower. When the cooling is done at the cooling rate of faster than 10° C./minute, coarse particles are formed, thereby leading to a broad particle size distribution. For example, when a toner is produced by an aggregation method, a broad particle size distribution of fine resin particles leads to form inhomogeneous colorants in toner particles, tending to cause adverse effects such as decrease in concentration when printed. Here, the cooling rate from a glass transition temperature (Tg) or lower to a room temperature is not particularly limited.

The equipment to be used in a method for producing an aqueous dispersion of fine resin particle in the present invention is not limited as far as it may apply a high-speed shear force in a vessel resistant to a high temperature and a high pressure. Examples of the equipments that can apply with a high-speed shear force include a crearmix, a homomixer, and a homogenizer.

Here, if an aqueous dispersion of fine resin particles of the present invention is used for a toner material, at least one of a colorant, a releasing material, and a charge control agent may be contained in a mixture in the mixing.

<Method for Producing Toner Particles of the Present Invention>

In the following, a method for producing toner particles of the present invention will be described.

A method for producing toner particles in the present invention includes aggregating to form aggregates by mixing at least an aqueous dispersion of fine resin particles and a colorant thereby aggregating the fine resin particles and the colorant in an aqueous medium and fusing the aggregates by heating, and is characterized in that the aqueous dispersion of fine resin particles is the aqueous dispersion of fine resin particles of the present invention. In addition, in the method for producing the toner particles in the present invention may further use a charge control agent and a releasing material as materials included in the toner particles.

Suitable examples of the colorants as mentioned above include following pigments and dyes.

Usable pigments or dyes of a cyan type may be exemplified by a copper phthalocyanine compound and its derivative, an anthraquinone compound, a basic dye lake compound, and the like. Specific examples include C.I. Pigment Blue 1, C.I. Pigment Blue 7, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 60, C.I. Pigment Blue 62, and C.I. Pigment Blue 66.

Examples of usable magenta pigments and dyes include a condensed azo compound, a diketopyrrolopyrole compound, an anthraquinone compound, a quinaqulidone compound, a basic dye lake compound, a naphthol compound, a benzimidazolone compound, a thioindigo compound, and a perylene compound.

Specific examples include C.I. Pigment Red 2, C.I. Pigment Red 3, C.I. Pigment Red 5, C.I. Pigment Red 6, C.I. Pigment Red 7, C.I. Pigment Violet 19, C.I. Pigment Red 23, C.I. Pigment Red 48:2, C.I. Pigment Red 48:3, C.I. Pigment Red 48:4, C.I. Pigment Red 57:1, C.I. Pigment Red 81:1, C.I. Pigment Red 122, C.I. Pigment Red 144, C.I. Pigment Red 146, C.I. Pigment Red 166, C.I. Pigment Red 169, C.I. Pigment Red 177, C.I. Pigment Red 184, C.I. Pigment Red 185, C.I. Pigment Red 202, C.I. Pigment Red 206, C.I. Pigment Red 220, C.I. Pigment Red 221, and C.I. Pigment Red 254.

Examples of usable yellow pigments and dyes include a condensed azo compound, an isoindolinone compound, an anthraquinone compound, an azo metal complex, a methine compound, and an allyl amide compound. Specific examples include C.I. Pigment Yellow 12, C.I. Pigment Yellow 13, C.I. Pigment Yellow 14, C.I. Pigment Yellow 15, C.I. Pigment Yellow 17, C.I. Pigment Yellow 62, C.I. Pigment Yellow 74, C.I. Pigment Yellow 83, C.I. Pigment Yellow 93, C.I. Pigment Yellow 94, C.I. Pigment Yellow 95, C.I. Pigment Yellow 97, C.I. Pigment Yellow 109, C.I. Pigment Yellow 110, C.I. Pigment Yellow 111, C.I. Pigment Yellow 120, C.I. Pigment Yellow 127, C.I. Pigment Yellow 128, C.I. Pigment Yellow 129, C.I. Pigment Yellow 147, C.I. Pigment Yellow 151, C.I. Pigment Yellow 154, C.I. Pigment Yellow 155, C.I. Pigment Yellow 168, C.I. Pigment Yellow 174, C.I. Pigment Yellow 175, C.I. Pigment Yellow 176, C.I. Pigment Yellow 180, C.I. Pigment Yellow 181, C.I. Pigment Yellow 191, and C.I. Pigment Yellow 194.

As a black colorant, a carbon black or a black colorant made black by the above-mentioned yellow/magenta/cyan colorants may be used.

These colorants may be used singly or as a mixture, or as a state of a solid solution. The colorant is selected from the aspects of hue angle, chroma, brightness, light resistance, OHP transparency, dispersion into toners, and the like.

Amount of the colorant to be added can be 1 to 20 parts by mass relative to 100 parts by mass of a binding resin.

The releasing material is the one having its melting point of preferably 150° C. or lower, more preferably 40° C. or higher and 130° C. or lower, and particularly preferably 40° C. or higher and 110° C. or lower.

Specific examples of the releasing material include low-molecular weight polyolefins such as polyethylene; silicones having a melting point by heating (softening temperature); aliphatic acid amides such as an oleinic acid amide, an erucic acid amide, a ricinoleic acid amide, and a stearic acid amide; ester waxes such as stearyl stearate; plant waxes such as a carnauba wax, a rice wax, a candelilla wax, a Japanese wax, and a jojoba oil; animal waxes such as a honey wax; mineral and oil waxes such as a montan wax, an ozokerite, a seresin, a paraffin wax, a microcrystalline wax, a Fischer-Tropsch wax, and an ester wax; and their modified substances.

The amount of the releasing material to be used can be 1 to 20 parts by mass relative to 100 parts by mass of a binding resin.

Examples of the charge control agents include a quaternary ammonium salt compound, a nigrosine compound, and a coordinated compound of aluminum, iron, chrome, zinc, zirconium, and the like. Here, the charge control agent can be the one not easily soluble in water in view of controlling of an ionic strength affecting stability during aggregation and fusion as well as re-use of waste water.

The amount of the charge control agent to be used can be 0.1 to 5 parts by mass relative to 100 parts by mass of a binding resin in view of further improvement in electrostatic properties.

A method for producing toner particles of the present invention is characterized by including aggregating to form aggregates by mixing an aqueous dispersion of fine resin particles, a colorant, and optionally an charge control agent, a releasing material, and the like, thereby aggregating the fine resin particles, the colorant, and the like in an aqueous medium until an intended diameter of toner particles is reached and fusing the aggregates by heating. The method for producing toner particles will be described further in detail, but the present invention is not limited to the following production methods.

(Aggregation)

In aggregation, a mixture solution is prepared by mixing an aqueous dispersion of fine resin particles of the present invention, a colorant, and other toner components including a releasing material. Then, aggregated particles are formed in the mixture solution to prepare a disperse solution of aggregated particles. The aggregated particles may be formed in the mixture solution by adding and mixing in the mixture solution, for example, a pH-controlling agent, an aggregating agent, and a stabilizer, and then heating them and applying a mechanical force and the like as appropriate.

The pH-controlling agent may be exemplified by an alkaline substance such as ammonia and sodium hydroxide and an acidic substance such as nitric acid and citric acid. The aggregating agent may be exemplified by a salt of monovalent metals such as sodium and potassium; a salt of divalent metals such as calcium and magnesium; a salt of trivalent metals such as iron and aluminum; and alcohols such as methanol, ethanol, and propanol. The stabilizer may be exemplified mainly by a surfactant as it is and an aqueous medium containing the same.

Addition and mixing of the aggregating agent and so on can be carried out at the same or lower temperature as a glass transition temperature (Tg) of fine resin particles contained in the mixture solution. Aggregation progresses stably when the mixing is carried out under such temperature condition. The mixing may be carried out by using a publicly known mixing equipment, a homogenizer, a mixer, and the like.

An average diameter of the aggregated particles formed therein is not particularly limited, and is generally controlled so as to give approximately the same level as an average diameter of toner particles to be obtained. The control may be easily done, for example, by appropriately setting or changing a temperature and the above-mentioned conditions of mixing by agitation. In the above-mentioned aggregation, aggregated particles having approximately the same diameter as that of the toner particles are formed, and thus a disperse solution of aggregated particles formed of dispersed aggregated particles may be prepared.

(Heating and Fusing)

In heating and fusing, the aggregated particles are heated to fuse. Prior to heating and fusing, the pH-controlling agent, the surfactant, an aggregation terminator, and the like may be added as needed to prevent melt-adhesion among toner particles from occurring.

Examples of the aggregation terminator include carboxylic acid salts such as trisodium citric acid, tripotassium citric acid, triammonium citric acid, trilithium citric acid, tetrasodium ethylenediamine tetraacetic acid, trisodium N-(2-hydroxyethyl)ethylenediamine-N,N',N'-triacetic acid, trisodium trinitrotriacetic acid, pentasodium diethylenetriamine pentaacetic acid, and hexasodium triethylenetetramine hexaacetic acid; and chelate resins such as sodium polyacrylic acid and sodium polymethacrylic acid.

Heating temperature may be between a glass transition temperature (Tg) of a resin contained in aggregated particles and a decomposition temperature of the resin.

Time needed for heating and fusing is shorter with a higher heating temperature, and longer with a lower heating temperature. In other word, the time for fusing cannot be simply defined because it depends on the heating temperature, but generally 30 minutes to 10 hours.

In the present invention, toners obtained by heating and fusing are washed, filtered, dried, and the like under appropriate conditions to obtain toner particles. Inorganic particles such as silica, alumina, titania, and calcium carbonate, and resin particles such as a vinyl resin, a polyester resin, and a silicone resin may be added to the surface of the obtained toner particles with applying a shear force under dry condition. These inorganic particles and resin particles function as an external additive such as a fluidity adjuvant and a cleaning adjuvant.

In the following, measurement methods for physical properties in the present invention will be described.

<Measurements of Molecular Weight Distribution (Mw/Mn), Weight-Average Molecular Weight (Mw), and Number-Average Molecular Weight (Mn) by Gel Permeation Chromatography (GPC) on Tetrahydrofurane (THF)-Solubles of Fine Resin Particles>

Molecular weight distribution (Mw/Mn), weight-average molecular weight (Mw), and number-average molecular weight (Mn) measured by GPC on the THF-solubles of fine resin particles are obtained as following.

A column is stabilized in a heat chamber at 40° C., and through the column at this temperature, tetrahydrofurane (THF) is flowed as the solvent at the flow rate of 1 mL/minute, and then about 100 μL of a THF sample solution is injected for measurement. In measuring a molecular weight of the sample, a molecular weight distribution of the sample is calculated from a relationship between counted numbers and logarithmic values of a calibration curve obtained from several kinds of standard monodisperse polystyrene samples. It is desirable that standard polystyrene samples for the calibration curve be those manufactured by Tosoh Corp. or Showa Denko K. K. with a molecular weight of the order of $10^2$ to $10^7$ and that at least about 10 different standard polystyrene samples be used. An RI (refractive index) detector is used as the detector. Combinations of a plurality of commercially available polystyrene gel columns may be used. Examples of the columns include combinations of Shodex GPC KF-801, 802, 803, 804, 805, 806, 807, and 800P (all manufactured by Showa Denko K. K.), and combinations of TSKgel G1000H (HXL), G2000H (HXL), G3000H (HXL), G4000H (HXL), G5000H (HXL), G6000H (HXL), G7000H (HXL), and TSKguardcolumn (all manufactured by Tosoh Corp.).

Samples are prepared as follows.

A resin (sample) is added into tetrahydrofurane (THF) and allowed to stand for several hours. Then, it is shaken with THF thoroughly for mixing (until no coalescence of samples is present), and then the mixture is set aside unmoved for 12 hours or more. At this time, the total time to allow to stand in THF is 24 hours or more. Thereafter, the mixture is passed through a filter for sample treatment (a filter of pore size of 0.45 to 0.5 μm, such as Myshoridisk H-25-5 manufactured by Tosoh Corp. and Ekikurodisk 25CR manufactured by Gelman Sciences Japan Ltd.) to obtain a GPC sample. Sample concentration is made 0.5 to 5 mg/mL as the resin component.

Furthermore, from the molecular weight distribution obtained, a molecular weight for a peak top of a main peak (Mp), and an amount of the component having molecular weight of 500 or more and less than 2000 relative to total components may be obtained. The amount of the component having molecular weight of 500 or more and less than 2000 relative to total components may be obtained, for example, by subtracting the accumulation value of the frequency distribution until a molecular weight of 500 from the accumulation value of the frequency distribution until a molecular weight of 2000.

<Measurement of Acid Value of Resin>

Acid value of a resin may be obtained as following. Here, a basic procedure according to JIS-K0070 is used. The acid value is defined as the amount (milligram) of potassium hydroxide needed to neutralize a free aliphatic acid, a resin acid, and the like contained in one gram of a sample.

(1) Reagents (a) Solvent: an ethyl ether-ethyl alcohol mixture (1+1 or 2+1) or a benzene-ethyl alcohol mixture (1+1 or 2+1), neutralized by a 0.1 mol/L potassium hydroxide-ethyl alcohol solution using a phenolphthalein indicator just prior to use.

(b) phenolphthalein solution: one gram of phenolphthalein is dissolved in 100 mL of ethyl alcohol (95% by volume).

(c) 0.1 mol/L potassium hydroxide-ethyl alcohol solution: 7.0 g of potassium hydroxide is dissolved in a smallest possible amount of water and then added by ethyl alcohol (95% by volume) to make one liter volume. The solution is filtered 2 to 3 days after the preparation, and determined according to JIS K8006 (basic item regarding to titration during testing of content of a reagent).

(2) Procedure

A resin (sample) is weighed accurately (1 to 20 g), added by 100 mL of a solvent and a few drops of the phenolphthalein solution as an indicator, and the resulting mixture is shaken thoroughly until complete dissolution of the sample. In the case of a solid sample, the sample is dissolved by heating in a water bath. After being cooled, the resulting solution is titrated by the 0.1 mol/L potassium hydroxide-ethyl alcohol solution. When a pale pink color of the indicator remains for 30 seconds, it is taken as the neutralization end point.

(3) Calculation Equation

Acid value is calculated by the following equation.

$$A = B \times f \times 5.611/S$$

A: acid value (mgKOH/g)
B: amount of the 0.1 mol/L potassium hydroxide-ethyl alcohol solution consumed (mL)
f: factor of the 0.1 mol/L potassium hydroxide-ethyl alcohol solution
S: sample (g)

<Measurements of Particle Size Distributions of Fine Particles Such as Fine Resin Particles, Fine Colorant Particles and Fine Releasing Material Particles>

Particle size distributions of fine particles such as fine resin particles, fine colorant particles and fine releasing material particles are measured by a laser diffraction/scattering particle size distribution measurement instrument (LA-920, manufactured by HORIBA, Ltd.) by following an operation manual of the measurement instrument.

Specifically, a sample for measurement is prepared so as to give a transmittance within the measurable range (70 to 95%)

at the sample charging point of the measurement instrument to measure a volume distribution.

The 50%-particle diameter based on the volume distribution is the particle diameter (median diameter) corresponding to 50% accumulation, and the 95%-particle diameter based on the volume distribution is the particle diameter corresponding to 95% accumulation from a side of small particles.

<Measurement of Number-Average Particle Diameter (D1) and Weight-Average Particle Diameter (D4) of Toner Particles>

Number-average particle diameter (D1) and weight-average particle diameter (D4) of the toner particles as mentioned above are measured by a particle size distribution analysis according to a Coulter method. Measurement is done by using an instrument Coulter Counter TA-II or Coulter Multi Sizer II (manufactured by Coulter Corp.) by following operation manuals of the instruments. A sodium chloride solution with about 1% concentration is prepared as an electrolytic solution by using a first grade sodium chloride. For example, ISO-TON-II (Coulter Scientific Japan, Inc.) may be used. Specifically, the measurement is done as following; into 100 to 150 mL of the electrolytic solution as mentioned above is added 0.1 to 5 mL of a surfactant (preferably an alkyl benzene sulfonic acid salt) as the dispersant, and then 2 to 20 mg of a sample for measurement (toner particles). The electrolytic solution containing suspended sample is subjected to a dispersion treatment in an ultrasonic disperser for about 1 to about 3 minutes. Volumes and numbers of the toners with 2.00 µm or larger in the resulting disperse solution are measured by the above-mentioned measurement instrument equipped with an aperture of 100 µm, and then a volume distribution and a number distribution of the toners are calculated. Then, the number-average particle diameter (D1) is obtained from the number distribution of the toner particles and the volume-average particle diameter (D4) is obtained from the volume distribution of the toner particles (a median of each channel is taken as a representative value of each channel).

Following 13 channels are used for the above-mentioned channels: 2.00 to 2.52 µm; 2.52 to 3.17 µm, 3.17 to 4.00 µm; 4.00 to 5.04 µm; 5.04 to 6.35 µm; 6.35 to 8.00 µm; 8.00 to 10.08 µm; 10.08 to 12.70 µm; 12.70 to 16.00 µm; 16.00 to 20.20 µm; 20.20 to 25.40 µm; 25.40 to 32.00 µm; and 32.00 to 40.30 µm.

EXAMPLES

Present invention will be described in detail by Examples, but aspects of the present invention are not limited to these Examples.

Example 1

A dispersing medium was prepared by dissolving 0.1 parts by mass of an anionic surfactant (NEOGEN RK, manufactured by Dai-ichi Kogyo Seiyaku Co., Ltd.) and 2.1 parts by mass of a basic substance N,N-dimethylamino ethanol in 100 parts by mass of an ion-exchanged water (aqueous medium). This dispersing medium was taken into a 350-mL stainless steel pressure vessel with a round bottom, and then, as an acid group-containing resin, 100 parts by mass of pulverized (particle diameter of 1 to 2 mm) "polyester resin A" [composition (mol ratio) of polyoxypropylene (2.2)-2,2-bis(4-hydroxyphenyl)propane:polyoxyethylene (2.0)-2,2-bis(4-hydroxyphenyl)propane:terephtahlic acid:fumaric acid:trimellitic acid=25:25:26:20:4, Mn=3,500, Mw=10,300, Mp=8,700, Mw/Mn=2.9, Tm=96° C., Tg=56° C., and acid value=11 mgKOH/g] was added to the dispersing medium and mixed.

Figure 1:
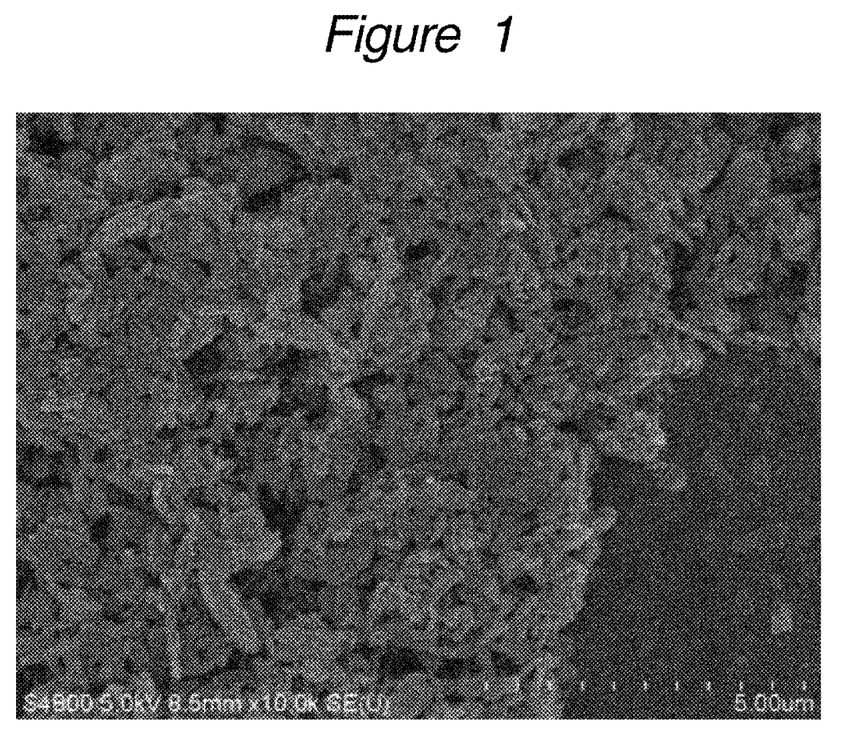
FIG. 1 is an electron microscopic picture showing the fine resin particles obtained by Example 1.

Then, a high-speed shear stress emulsifier crearmix (CLM-2.2S, manufactured by M Technique Co., Ltd.) was connected to the stainless steel pressure vessel with a round bottom in an airtight manner. The mixture in the vessel was dispersed with a shear force by a rotor rotation of the crearmix at 18,000 rounds/minute for 30 minutes under heating at 115° C. and pressure at 0.18 MPa. Then, the mixture was cooled to 50° C. at the cooling rate of 2.0° C./minute with maintaining the rotation speed at 18,000 rounds/minute to obtain an aqueous dispersion 1 of fine resin particles. An electron microscopic observation result (10,000-magnifications, refer to FIG. 1) of the fine resin particles showed that the average minor axis was 0.22 µm, the average major axis was 0.56 µm, the average ratio of the major axis to the minor axis was 2.72, and the content of particles with the ratio of the major axis to the minor axis being less than 1.50 was 2% relative to the total. The 50%-particle diameter based on the volume distribution of the fine resin particles was 0.24 µm, and the 95%-particle diameter was 0.31 µm, as measured by a laser diffraction/scattering particle size distribution measurement instrument (LA-920, manufactured by HORIBA, Ltd.).

Storage of the obtained aqueous dispersion 1 of fine polyester resin particles at room temperature (25° C.) for 90 days did not result in sedimentation and separation. Similarly, there was no change when it was set aside at 40° C. for 72 hours. The above-mentioned results are shown in Table 1.

Here, the criteria of the storage stability in Tables 1 and 2 are as following.

When sedimentation and separation did not occur under each of the storage conditions, "at room temperature (25° C.) for 90 days" and "at 40° C. for 72 hours", it was classified as "A". When sedimentation and separation were slightly observed, it was classified as "B". When sedimentation and separation were clearly observed, it was classified as "C".

Example 2

A dispersing medium was prepared by dissolving 0.02 parts by mass of a nonionic surfactant (NOIGEN EA-137, manufactured by Dai-ichi Kogyo Seiyaku Co., Ltd.) and 2.1 parts by mass of a basic substance N,N-dimethylamino ethanol in 100 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, the subsequent operation was followed in a similar manner to that of Example 1 except that the cooling rate was changed to 0.5° C./minute to obtain an aqueous dispersion 2 of fine resin particles.

Production conditions as mentioned above, physical properties of the fine resin particles, and evaluation results are shown in Table 1.

Example 3

A dispersing medium was prepared by dissolving 0.02 parts by mass of an anionic surfactant (NEOGEN SC, manufactured by Dai-ichi Kogyo Seiyaku Co., Ltd.) and 2.1 parts by mass of a basic substance N,N-dimethylamino ethanol in 100 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, the subsequent operation was followed in a similar manner to that of Example 1 except that the cooling rate was changed to 0.5° C./minute to obtain an aqueous dispersion 3 of fine resin particles.

Production conditions as mentioned above, physical properties of the fine resin particles, and evaluation results are shown in Table 1.

Example 4

A dispersing medium was prepared by dissolving 3 parts by mass of a nonionic surfactant (NOIGEN EA-137, manufactured by Dai-ichi Kogyo Seiyaku Co., Ltd.) and 2.1 parts by mass of a basic substance N,N-dimethylamino ethanol in 81.8 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, the subsequent operation was followed in a similar manner to that of Example 1 to obtain an aqueous dispersion 4 of fine resin particles.

Production conditions as mentioned above, physical properties of the fine resin particles, and evaluation results are shown in Table 1.

Example 5

A dispersing medium was prepared by dissolving 3 parts by mass of a nonionic surfactant (NOIGEN EA-137, manufactured by Dai-ichi Kogyo Seiyaku Co., Ltd.) and 2.1 parts by mass of a basic substance N,N-dimethylamino ethanol in 150 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, the subsequent operation was followed in a similar manner to that of Example 1 to obtain an aqueous dispersion 5 of fine resin particles.

Production conditions as mentioned above, physical properties of the fine resin particles, and evaluation results are shown in Table 1.

Example 6

A dispersing medium was prepared by dissolving 10 parts by mass of a nonionic surfactant (NOIGEN EA-137, manufactured by Dai-ichi Kogyo Seiyaku Co., Ltd.) and 2.1 parts by mass of a basic substance N,N-dimethylamino ethanol in 233.3 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, the subsequent operation was followed in a similar manner to that of Example 1 except that the cooling rate was changed to 1.0° C./minute to obtain an aqueous dispersion 6 of fine resin particles.

Production conditions as mentioned above, physical properties of the fine resin particles, and evaluation results are shown in Table 1.

Example 7

A dispersing medium was prepared by dissolving 10 parts by mass of a nonionic surfactant (NOIGEN EA-137, manufactured by Dai-ichi Kogyo Seiyaku Co., Ltd.) and 2.1 parts by mass of a basic substance N,N-dimethylamino ethanol in 566.7 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, the subsequent operation was followed in a similar manner to that of Example 1 to obtain an aqueous dispersion 7 of fine resin particles.

Production conditions as mentioned above, physical properties of the fine resin particles, and evaluation results are shown in Table 1.

Example 8

A dispersing medium was prepared by dissolving 1 parts by mass of an anionic surfactant (NEOGEN SC, manufactured by Dai-ichi Kogyo Seiyaku Co., Ltd.) and 2.1 parts by mass of a basic substance N,N-dimethylamino ethanol in 100 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, the subsequent operation was followed in a similar manner to that of Example 1 except that the cooling rate was changed to 5.0° C./minute to obtain an aqueous dispersion 8 of fine resin particles.

Production conditions as mentioned above, physical properties of the fine resin particles, and evaluation results are shown in Table 1.

Example 9

A dispersing medium was prepared by dissolving 6 parts by mass of a nonionic surfactant (NOIGEN EA-137, manufactured by Dai-ichi Kogyo Seiyaku Co., Ltd.) and 2.1 parts by mass of a basic substance N,N-dimethylamino ethanol in 233.3 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, the subsequent operation was followed in a similar manner to that of Example 1 except that the cooling rate was changed to 10.0° C./minute to obtain an aqueous dispersion 9 of fine resin particles.

Production conditions as mentioned above, physical properties of the fine resin particles, and evaluation results are shown in Table 1.

Example 10

A dispersing medium was prepared by dissolving 10 parts by mass of a nonionic surfactant (NOIGEN EA-137, manufactured by Dai-ichi Kogyo Seiyaku Co., Ltd.) and 1.8 parts by mass of a basic substance N,N-diethylamino ethanol in 150 parts by mass of an ion-exchanged water. Then, as an acid group-containing resin, 100 parts by mass of pulverized (particle diameter of 1 to 2 mm) "polyester resin B" [composition (mol ratio) of polyoxypropylene (2.2)-2,2-bis(4-hydroxyphenyl)propane:ethyleneglycol:terephtahlic acid:maleic acid:trimellitic acid=35:15:33:15:2, Mn=4,600, Mw=16,500, Mp=10,400, Mw/Mn=3.6, Tm=117° C., Tg=67° C., and acid value=13 mgKOH/g] was added to the dispersing medium and mixed.

Then, a high-speed shear stress emulsifier crearmix (CLM-2.2S, manufactured by M Technique Co., Ltd.) was connected to the stainless steel pressure vessel with a round bottom in an airtight manner. The mixture in the vessel was dispersed with a shear force by a rotor rotation of the crearmix at 20,000 rounds/minute for 30 minutes under heating at 140° C. and pressure at 0.36 MPa. Then, the mixture was cooled to 75° C. at the cooling rate of 0.5° C./minute with maintaining the rotation speed at 20,000 rounds/minute to obtain an aqueous dispersion 10 of fine resin particles.

Production conditions as mentioned above, physical properties of the fine resin particles, and evaluation results are shown in Table 1.

Example 11

A dispersing medium was prepared by dissolving 10 parts by mass of a nonionic surfactant (NOIGEN EA-137, manufactured by Dai-ichi Kogyo Seiyaku Co., Ltd.) and 1.8 parts by mass of a basic substance N,N-diethylamino ethanol in 122.2 parts by mass of an ion-exchanged water. Then, 100 parts by mass of pulverized "polyester resin B" (particle diameter of 1 to 2 mm) was added to the dispersing medium and mixed.

Thereafter, the subsequent operation was followed in a similar manner to that of Example 10, except that the cooling rate was changed to 0.7° C./minute, to obtain an aqueous dispersion 11 of fine resin particles.

Production conditions as mentioned above, physical properties of the fine resin particles, and evaluation results are shown in Table 1.

Example 12

A dispersing medium was prepared by dissolving 3 parts by mass of an anionic surfactant (NEOGEN RK, manufactured by Dai-ichi Kogyo Seiyaku Co., Ltd.) and 2.0 parts by mass of a basic substance N,N-diethylamino ethanol in 150 parts by mass of an ion-exchanged water (aqueous medium). This dispersing medium was taken into a 350-mL stainless steel pressure vessel with a round bottom, and then, as an acid group-containing resin, 100 parts by mass of pulverized (particle diameter of 1 to 2 mm) "styrene-n-butyl acrylate-acrylic acid copolymer resin" [composition (mol ratio) of styrene:n-butyl acrylate:acrylic acid=71:28:1, Mn=3,300, Mw=15,200, Mp=9,900, Mw/Mn=4.6, Tm=119° C., Tg=57° C., and acid value=12 mgKOH/g] was added to the dispersing medium and mixed. Then, a high-speed shear stress emulsifier crearmix (CLM-2.2S, manufactured by M Technique Co., Ltd.) was connected to the stainless steel pressure vessel with a round bottom in an airtight manner. The mixture in the vessel was dispersed with a shear force by a rotor rotation of the crearmix at 20,000 rounds/minute for 30 minutes under heating at 145° C. and pressure at 0.41 MPa. Then, the mixture was cooled to 55° C. at the cooling rate of 2.0° C./minute with maintaining the rotation speed at 20,000 rounds/minute to obtain an aqueous dispersion 12 of fine resin particles.

Production conditions as mentioned above, physical properties of the fine resin particles, and evaluation results are shown in Table 1.

Example 13

A dispersing medium was prepared by dissolving 0.1 parts by mass of an anionic surfactant (NEOGEN RK, manufactured by Dai-ichi Kogyo Seiyaku Co., Ltd.) and 2.1 parts by mass of a basic substance N,N-dimethylamino ethanol in 100 parts by mass of an ion-exchanged water (aqueous medium). This dispersing medium was taken into a 350-mL stainless steel pressure vessel with a round bottom, and then, 100 parts by mass of pulverized "polyester resin A" (particle diameter of 1 to 2 mm) and 10 parts by mass of an ester wax (behenyl behenate, melting point of 75° C.) as a releasing material were added to the dispersing medium and mixed.

Thereafter, the subsequent operation was followed in a similar manner to that of Example 1 to obtain an aqueous dispersion 13 of mixed fine particles of the resin and the releasing material.

Production conditions as mentioned above, physical properties of the fine resin particles, and evaluation results are shown in Table 1.

Example 14

In advance, 5 parts by mass of a cyan pigment (C.I. Pigment Blue 15:3), 0.5 parts by mass of an anionic surfactant (NEOGEN RK, manufactured by Dai-ichi Kogyo Seiyaku Co., Ltd.), and 44.5 parts by mass of an ion-exchanged water were mixed and then dispersed at 24,000 rounds/minutes for 30 minutes by a homogenizer (Ultra Turrax T50, manufactured by IKA Japan, Co., Ltd.) to prepare a colorant disperse solution A formed of the dispersed cyan pigment. The 50%-particle diameter based on the volume distribution of the colorant (cyan pigment) in the colorant disperse solution A was 0.34 μm and the colorant particle concentration was 10% by mass.

A dispersing medium was prepared by dissolving 0.25 parts by mass of an anionic surfactant (NEOGEN RK, manufactured by Dai-ichi Kogyo Seiyaku Co., Ltd.) and 2.1 parts by mass of a basic substance N,N-dimethylamino ethanol in 55.5 parts by mass of an ion-exchanged water (aqueous medium). This dispersing medium was taken into a 350-mL stainless steel pressure vessel with a round bottom, and then 55.5 parts by mass of pulverized "polyester resin A" (particle diameter of 1 to 2 mm) and 100 parts by mass of a colorant disperse solution A formed of the dispersed cyan pigment were added to the dispersing medium and mixed.

Thereafter, the subsequent operation was followed in a similar manner to that of Example 1 to obtain an aqueous dispersion 14 of mixed fine particles of the resin and the pigment.

Production conditions as mentioned above, physical properties of the fine resin particles, and evaluation results are shown in Table 1.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| No. of aqueous dispersion of fine resin particles | | 1 | 2 | 3 | 4 | 5 | 6 | 7 |
| Resin | Kind of resin | A | A | A | A | A | A | A |
|  | Resin ratio | 0.50 | 0.50 | 0.50 | 0.55 | 0.40 | 0.30 | 0.15 |
| Surfactant | Kind | A1 | N1 | A2 | N1 | N1 | N1 | N1 |
|  | Concentration [%/resin] | 0.1 | 0.02 | 0.02 | 3 | 3 | 10 | 10 |
| Basic substance | Kind | C1 | C1 | C1 | C1 | C1 | C1 | C1 |
|  | Concentration [%/resin] | 2.1 | 2.1 | 2.1 | 2.1 | 2.1 | 2.1 | 2.1 |
| Production method | Emulsification temperature (° C.) | 115 | 115 | 115 | 115 | 115 | 115 | 115 |
|  | Cooling rate [° C./minute] | 2.0 | 0.5 | 0.5 | 2.0 | 2.0 | 1.0 | 2.0 |
| Diameter of fine particles | Average minor axis [μm] | 0.22 | 0.23 | 0.16 | 0.12 | 0.30 | 0.13 | 0.29 |
|  | Average major axis [μm] | 0.56 | 0.61 | 0.58 | 0.30 | 0.92 | 0.40 | 0.73 |
|  | Average major axis/minor axis | 2.7 | 2.7 | 3.6 | 2.5 | 3.1 | 3.1 | 2.5 |
|  | Rate of major axis/minor axis <1.5 | 2% | 2% | 2% | 2% | 2% | 2% | 4% |
|  | 50%-Particle diameter based on volume distribution [μm] | 0.24 | 0.23 | 0.17 | 0.12 | 0.31 | 0.13 | 0.30 |
|  | 95%-Particle diameter [μm] | 0.31 | 0.34 | 0.27 | 0.16 | 0.42 | 0.18 | 0.40 |
| Storage stability | 90 days at room temperature | A | A | A | A | A | A | B |
|  | 72 hours at 40° C. | A | A | A | A | A | A | A |

|  |  | Ex. 8 | Ex. 9 | Ex. 10 | Ex. 11 | Ex. 12 | Ex. 13 | Ex. 14 |
|---|---|---|---|---|---|---|---|---|
| No. of aqueous dispersion of fine resin particles | | 8 | 9 | 10 | 11 | 12 | 13 | 14 |
| Resin | Kind of resin | A | A | B | B | C | A | A |
|  | Resin ratio | 0.50 | 0.30 | 0.40 | 0.45 | 0.40 | 0.54 | 0.50 |
| Surfactant | Kind | A2 | N1 | N1 | N1 | A1 | A1 | A1 |
|  | Concentration [%/resin] | 1 | 6 | 10 | 10 | 3 | 0.1 | 0.75 |
| Basic substance | Kind | C1 | C1 | C2 | C2 | C2 | C1 | C1 |
|  | Concentration [%/resin] | 2.1 | 2.1 | 1.8 | 1.8 | 2.0 | 2.1 | 2.1 |
| Production method | Emulsification temperature (° C.) | 115 | 115 | 140 | 140 | 145.0 | 115 | 115 |
|  | Cooling rate [° C./minute] | 5.0 | 10.0 | 0.7 | 0.5 | 2.0 | 2.0 | 2.0 |
| Diameter of fine particles | Average minor axis [μm] | 0.35 | 0.66 | 0.20 | 0.14 | 0.28 | 0.18 | 0.21 |
|  | Average major axis [μm] | 1.00 | 1.95 | 0.56 | 0.39 | 0.73 | 0.52 | 0.57 |
|  | Average major axis/minor axis | 2.9 | 3.0 | 2.8 | 2.8 | 2.6 | 2.9 | 2.7 |
|  | Rate of major axis/minor axis <1.5 | 2% | 2% | 2% | 2% | 2% | 2% | 2% |
|  | 50%-Particle diameter based on volume distribution [μm] | 0.36 | 0.67 | 0.21 | 0.15 | 0.29 | 0.19 | 0.22 |
|  | 95%-Particle diameter [μm] | 0.49 | 0.97 | 0.43 | 0.25 | 0.42 | 0.29 | 0.31 |
| Storage stability | 90 days at room temperature | A | B | A | A | A | A | A |
|  | 72 hours at 40° C. | A | A | A | A | A | A | A |

A1: Anionic surfactant (NEOGEN RK, manufactured by Dai-ichi Kogyo Seiyaku Co., Ltd.)
A2: Anionic surfactant (NEOGEN SC, manufactured by Dai-ichi Kogyo Seiyaku Co., Ltd.)
C1: N,N-dimethylamino ethanol
C2: N,N-diethylamino ethanol
N1: Nonionic surfactant (NOIGEN EA-137, manufactured by Dai-ichi Kogyo Seiyaku Co., Ltd.)
Resin ratio: Mass of fine resin particles/total mass of aqueous medium and fine resin particles Comparative Example 1

Polyester resin A was pulverized by a low-temperature pulverizer Linrex Mill (manufactured by Hosokawa Micron Corp.) to the maximum particle diameter of 100 μm or less to obtain the pulverized resin with the 50%-particle diameter based on the volume distribution being 18 μm. Into 900 parts by mass of an ion-exchanged water were mixed 100 parts by mass of this pulverized resin, 3 parts by mass of a nonionic surfactant (NOIGEN EA-137, manufactured by Dai-ichi Kogyo Seiyaku Co., Ltd.), and 4.8 parts by mass of a basic substance N,N-dimethylamino ethanol. By using a high-pressure impact disperser (Nanomizer, manufactured by Yoshida Kikai Co., Ltd.), the obtained mixture was heated at 155° C. just before entering a treatment unit (generator) and emulsified in the treatment unit at 200 MPa, and then cooled to room temperature at the cooling rate of 10° C./minute. This operation was repeated five times to obtain an aqueous dispersion 15 of fine resin particles.

An electron microscopic observation result (20,000-magnifications) of the fine resin particles showed that the particles were spherical with the average minor axis being 0.18 μm, the average major axis being 0.19 μm, and the average ratio of the major axis to the minor axis being 1.05, and the contents of particles with the ratio of the major axis to the minor axis being less than 1.50 was 100% relative to the total. The 50%-particle diameter based on the volume distribution of the fine resin particles was 0.18 μm, and the 95%-particle diameter was 0.25 μm, as measured by a laser diffraction/scattering particle size distribution measurement instrument (LA-920, manufactured by HORIBA, Ltd.).

The aqueous dispersion 15 of fine resin particles was measured and evaluated in a similar manner to that in Example 1.

Production conditions as mentioned above, physical properties of the fine resin particles, and evaluation results are shown in Table 2.

Comparative Example 2

Polyester resin A was pulverized in a similar manner to that in Comparative Example 1 by a low-temperature pulverizer Linrex Mill (manufactured by Hosokawa Micron Corp.) to the maximum particle diameter of 100 μm or less to obtain the pulverized resin with the 50%-particle diameter based on the volume distribution being 18 μm. Into 233 parts by mass of an ion-exchanged water were mixed 100 parts by mass of this pulverized resin, 10 parts by mass of a nonionic surfactant (NOIGEN EA-137, manufactured by Dai-ichi Kogyo Seiyaku Co., Ltd.), and 4.8 parts by mass of a basic substance N,N-dimethylamino ethanol. By using a high-pressure impact disperser (Nanomizer, manufactured by Yoshida Kikai Co., Ltd.), the obtained mixture was heated at 155° C. just before entering a treatment unit (generator) and emulsified in the treatment unit at 200 MPa. However, an aqueous dispersion of fine resin particles could not be obtained because clogging occurred in the treatment unit.

Comparative Example 3

Polyester resin B was pulverized by a low-temperature pulverizer Linrex Mill (manufactured by Hosokawa Micron Corp.) to the maximum particle diameter of 100 μm or less to obtain the pulverized resin with the 50%-particle diameter based on the volume distribution being 2.2 μm. Into 900 parts by mass of an ion-exchanged water were mixed 100 parts by mass of this pulverized resin, 10 parts by mass of a nonionic surfactant (NOIGEN EA-137, manufactured by Dai-ichi Kogyo Seiyaku Co., Ltd.), and 4.5 parts by mass of a basic substance N,N-diethylamino ethanol. By using a high-pressure impact disperser (Nanomizer, manufactured by Yoshida Kikai Co., Ltd.), the obtained mixture was heated at 155° C. just before entering a treatment unit (generator) and emulsified in the treatment unit at 200 MPa, and then cooled to room temperature at the cooling rate of over 10° C./minute. This operation was repeated five times to obtain an aqueous dispersion 16 of fine resin particles.

The aqueous dispersion 16 of fine resin particles was measured and evaluated in a similar manner to that in Example 1.

Production conditions as mentioned above, physical properties of the fine resin particles, and evaluation results are shown in Table 2.

Comparative Example 4

A dispersing medium was prepared by dissolving 3 parts by mass of a nonionic surfactant (NOIGEN EA-137, manufactured by Dai-ichi Kogyo Seiyaku Co., Ltd.) and 2.1 parts by mass of a basic substance N,N-dimethylamino ethanol in 66.6 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, to obtain an aqueous dispersion of fine resin particles, the subsequent operation was followed in a similar manner to that of Example 1, but the fine resin particles adhered with each other after being cooled.

Comparative Example 5

A dispersing medium was prepared by dissolving 30 parts by mass of an anionic surfactant (NEOGEN SC, manufactured by Dai-ichi Kogyo Seiyaku Co., Ltd.) and 2.1 parts by mass of a basic substance N,N-dimethylamino ethanol in 900 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed. Thereafter, the subsequent operation was followed in a similar manner to that of Example 1 to obtain an aqueous dispersion 17 of fine resin particles. The 50%-particle diameter based on the volume distribution of the fine resin particles was 17.55 μm, and the 95%-particle diameter was 45.05 μm, as measured by a laser diffraction/scattering particle size distribution measurement instrument (LA-920, manufactured by HORIBA, Ltd.). Here, measurements of the minor axis and the major axis of the particle by an electron microscope observation were not performed because the particle diameters were too large.

Storage of the obtained aqueous dispersion 17 of fine resin particles at room temperature (25° C.) for 90 days resulted in separation and sedimentation of the fine resin particles from the aqueous medium, leading to solidification of the particles. Similarly, setting aside at 40° C. for 72 hours resulted in sedimentation and solidification. The above-mentioned results are shown in Table 2.

Comparative Example 6

A dispersing medium was prepared by dissolving 0.1 parts by mass of a nonionic surfactant (NOIGEN EA-137, manufactured by Dai-ichi Kogyo Seiyaku Co., Ltd.) and 2.1 parts by mass of a basic substance N,N-dimethylamino ethanol in 100 parts by mass of an ion-exchanged water (aqueous medium). This dispersing medium was taken into a 350-mL stainless steel pressure vessel with a round bottom, and then 100 parts by mass of pulverized "polyester resin A" (particle diameter of 1 to 2 mm) was added to the dispersing medium and mixed.

Thereafter, to obtain an aqueous dispersion of fine resin particles, the subsequent operation was followed in a similar manner to that of Example 1, except that the cooling rate was changed to 20.0° C./minute, but the particles were solidified after being cooled.

TABLE 2

|  |  | Com. Ex. 1 | Com. Ex. 2 | Com. Ex. 3 | Com. Ex. 4 | Com. Ex. 5 | Com. Ex. 6 |
|---|---|---|---|---|---|---|---|
| No. of aqueous dispersion of fine resin particles | | 15 | — | 16 | — | 17 | — |
| Resin | Kind of resin | A | A | B | A | A | A |
| | Resin ratio | 0.10 | 0.30 | 0.10 | 0.60 | 0.10 | 0.50 |
| Surfactant | Kind | N1 | N1 | N1 | N1 | A2 | N1 |
| | Concentration [%/resin] | 3 | 10 | 10 | 3 | 30 | 0.02 |
| Basic substance | Kind | C1 | C1 | C2 | C1 | C1 | C1 |
| | Concentration [%/resin] | 4.8 | 4.8 | 4.5 | 2.1 | 2.1 | 2.1 |
| Production method | Emulsification temperature (° C.) | 155 | 155 | 180 | 115 | 115 | 115 |
| | Cooling rate [° C./minute] | — | — | — | 2.0 | 2.0 | 20 |
| Diameter of fine particles | Average minor axis [μm] | 0.18 | — | 0.55 | — | — | — |
| | Average major axis [μm] | 0.19 | — | 0.57 | — | — | — |
| | Average major axis/minor | 1.1 | — | 1.0 | — | — | — |

TABLE 2-continued

|  |  | Com. Ex. 1 | Com. Ex. 2 | Com. Ex. 3 | Com. Ex. 4 | Com. Ex. 5 | Com. Ex. 6 |
|---|---|---|---|---|---|---|---|
|  | axis |  |  |  |  |  |  |
|  | Rate of major axis/minor axis <1.5 | 100 | — | 100 | — | — | — |
|  | 50%-Particle diameter based on volume distribution [μm] | 0.18 | — | 0.56 | — | 17.55 | — |
|  | 95%-Particle diameter [μm] | 0.25 | — | 0.73 | — | 45.05 | — |
| Storage stability | 90 days at room temperature | B | — | B | — | C | — |
|  | 72 hours at 40° C. | B | — | B | — | C | — |

A1: Anionic surfactant (NEOGEN RK, manufactured by Dai-ichi Kogyo Seiyaku Co., Ltd.)
A2: Anionic surfactant (NEOGEN SC, manufactured by Dai-ichi Kogyo Seiyaku Co., Ltd.)
C1: N,N-dimethylamino ethanol
C2: N,N-diethylamino ethanol
N1: Nonionic surfactant (NOIGEN EA-137, manufactured by Dai-ichi Kogyo Seiyaku Co., Ltd.)
Resin ratio: Mass of fine resin particles/total mass of aqueous medium and fine resin particles <Production Example of Toners>

A production method including mixing at least an aqueous dispersion of fine resin particles and a colorant thereby aggregating the fine resin particles and the colorant in an aqueous medium to form aggregates, and fusing the aggregates by heating, and a toner obtained by this production method will be described.

(Production Example of Toner 1)

<Preparation of a Disperse Solution of a Releasing Material>

Paraffin wax (HNP 9 (melting point of 77° C.), manufactured by Nippon Seiro Co., Ltd.) 100 parts by mass Anionic surfactant (NEOGEN RK, manufactured by Dai-ichi Kogyo Seiyaku Co., Ltd.) 20 parts by mass Ion-exchanged water 880 parts by mass The above substances were heated at 95° C. and dispersed by a homogenizer (Ultra Turrax T50, manufactured by IKA Japan, Co., Ltd.), and then by a Golin high pressure homogenizer (manufactured by SMT Co., Ltd.) to prepare a disperse solution of a releasing material formed of a dispersed releasing material with the 50%-particle diameter based on the volume distribution being 0.22 μm (concentration of the releasing material: 10% by mass).

<Preparation of a Colorant Disperse Solution B>

Cyan pigment (C.I. PB 15:3) 100 parts by mass

Anionic Surfactant (NEOGEN RK, manufactured by Dai-ichi Kogyo Seiyaku Co., Ltd.) 15 parts by mass Ion-exchanged water 885 parts by mass The above substances were mixed, dissolved, and dispersed by using a high-pressure impact disperser (Nanomizer, manufactured by Yoshida Kikai Co., Ltd.) for about one hour to prepare a colorant disperse solution B formed of a dispersed colorant (cyan pigment). The 50%-particle diameter of the colorant in the colorant disperse solution B based on the volume distribution was 0.15 μm and the concentration of the colorant particles was 10% by mass.

<Preparation of a Mixture Solution>

| Aqueous dispersion 1 of fine resin particles | 200 parts by mass |
|---|---|
| Above-mentioned colorant disperse solution B | 50 parts by mass |
| Above-mentioned disperse solution of the releasing material | 70 parts by mass |
| Magnesium sulfate | 2 parts by mass |
| Ion-exchanged water | 800 parts by mass |

The above substances were charged into a one-liter separable flask equipped with an agitator, a cooling tube, and a thermometer, and then agitated.

<Aggregation>

This mixture solution in the flask was heated to 50° C. with agitation in a heating oil bath. At this temperature, 30 parts by mass of an aqueous dispersion (10% resin concentration) obtained by diluting the aqueous dispersion 1 of fine resin particles with an ion-exchanged water by 5 folds was added to the mixture solution. Thereafter, the resulting mixture was kept at 57° C. for one hour, and then the volume-average particle diameter of the formed aggregated particles was measured by a flow particle image analyzer (FPIA-3000, manufactured by Sysmex Corp.) according to an operation manual of the instrument. As a result, it was confirmed that aggregated particles with the volume-average particle diameter being about 5.3 μm were formed.

<Fusion>

Thereafter, 3 parts by mass of an anionic surfactant (NEOGEN RK, manufactured by Dai-ichi Kogyo Seiyaku Co., Ltd.) was added to the above mixture obtained, and then heated to 75° C. with continued agitation and then held for 3 hours. Thereafter, the resulting mixture was cooled to obtain toner particle slurry 1.

<Filtration and Washing>

Thereafter, the slurry 1 was filtered for a solid-liquid separation, and then the solid was added by an ion-exchanged water with three times the amount of the slurry, washed with agitation for 30 minutes, and then filtered again.

In order to avoid the effects of residual surfactant, washing and filtration as mentioned above were repeated until the electric conductivity of the filtered solution reached 150 μS/cm or lower. When the washing was repeated three times, the electric conductivity of the filtered solution reached 150 μS/cm or lower.

The obtained solid was dried to obtain toner particles 1.

Measurement of the toner particles by Coulter Multi Sizer II (manufactured by Coulter Corp.) showed that the weight-average particle diameter D4 was 5.4 μm and the number-average particle diameter D1 was 4.5 μm.

To the obtained toner particles 1, hydrophobic fine silica powder having a BET specific surface area of 200 m$^2$/g (primary average particle diameter of 0.01 μm) were mixed to prepare toner 1 with the silica concentration of 1.7% by mass.

(Production Examples of Toner 2 and Toner 3)

Toner particle slurries 2 and 3 were obtained in a similar manner to that of Production Example of Toner 1, except that the aqueous dispersion 1 of fine resin particles was changed to the aqueous dispersion 2 or 3 of fine resin particles.

Then, filtration and washing were done in a similar manner to that of Production Example of Toner 1. When the washing was repeated three times, the electric conductivity of the filtered solution reached 150 μS/cm or lower.

Thereafter, drying was done in a similar manner to that of Production Example of Toner 1 to obtain toner particles 2 and 3. Toners 2 and 3 were prepared by external adherence in a similar manner to that of Production Example of Toner 1.

(Production Example of Toner 4)

Toner particle slurry 4 was obtained in a similar manner to that of Production Example of Toner 1, except that the mixture solution was changed to the following composition and the anionic surfactant (NEOGEN RK, manufactured by Dai-ichi Kogyo Seiyaku Co., Ltd.) was changed to 10 parts by mass of trisodium citrate.

| | |
|---|---|
| Aqueous dispersion 4 of fine resin particles | 182 parts by mass |
| Above-mentioned colorant disperse solution B | 50 parts by mass |
| Above-mentioned disperse solution of the releasing material | 50 parts by mass |
| Magnesium sulfate | 2 parts by mass |
| Ion-exchanged water | 818 parts by mass |

Then, filtration and washing were done in a similar manner to that of Production Example of Toner 1. When the washing was repeated four times, the electric conductivity of the filtered solution reached 150 μS/cm or lower.

Thereafter, drying was done in a similar manner to that of Production Example of Toner 1 to obtain toner particles 4. Toner 4 was prepared by external adherence in a similar manner to that of Production Example of Toner 1.

(Production Example of Toner 5)

Toner particle slurry 5 was obtained in a similar manner to that of Production Example of Toner 4, except that the mixture solution was changed to the following composition.

| | |
|---|---|
| Aqueous dispersion 5 of fine resin particles | 250 parts by mass |
| Above-mentioned colorant disperse solution B | 50 parts by mass |
| Above-mentioned disperse solution of the releasing material | 50 parts by mass |
| Magnesium sulfate | 2 parts by mass |
| Ion-exchanged water | 750 parts by mass |

Then, filtration and washing were done in a similar manner to that of Production Example of Toner 1. When the washing was repeated four times, the electric conductivity of the filtered solution reached 150 μS/cm or lower.

Thereafter, drying was done in a similar manner to that of Production Example of Toner 1 to obtain toner particles 5. Toner 5 was prepared by external adherence in a similar manner to that of Production Example of Toner 1.

(Production Example of Toner 6)

Toner particle slurry 6 was obtained in a similar manner to that of Production Example of Toner 1, except that the mixture solution was changed to the following composition.

| | |
|---|---|
| Aqueous dispersion 6 of fine resin particles | 333 parts by mass |
| Above-mentioned colorant disperse solution B | 50 parts by mass |
| Above-mentioned disperse solution of the releasing material | 50 parts by mass |
| Magnesium sulfate | 2 parts by mass |
| Ion-exchanged water | 667 parts by mass |

Then, filtration and washing were done in a similar manner to that of Production Example of Toner 1. When the washing was repeated five times, the electric conductivity of the filtered solution reached 150 μS/cm or lower.

Thereafter, drying was done in a similar manner to that of Production Example of Toner 1 to obtain toner particles 6. Toner 6 was prepared by external adherence in a similar manner to that of Production Example of Toner 1.

(Production Example of Toner 7)

Toner particle slurry 7 was obtained in a similar manner to that of Production Example of Toner 1, except that the mixture solution was changed to the following composition.

| | |
|---|---|
| Aqueous dispersion 7 of fine resin particles | 667 parts by mass |
| Above-mentioned colorant disperse solution B | 50 parts by mass |
| Above-mentioned disperse solution of the releasing material | 50 parts by mass |
| Magnesium sulfate | 2 parts by mass |
| Ion-exchanged water | 333 parts by mass |

Then, filtration and washing were done in a similar manner to that of Production Example of Toner 1. When the washing was repeated six times, the electric conductivity of the filtered solution reached 150 μS/cm or lower.

Thereafter, drying was done in a similar manner to that of Production Example of Toner 1 to obtain toner particles 7. Toner 7 was prepared by external adherence in a similar manner to that of Production Example of Toner 1.

(Production Example of Toner 8)

Toner particle slurry 8 was obtained in a similar manner to that of Production Example of Toner 1, except that the aqueous dispersion 1 of fine resin particles was changed to the aqueous dispersion 8 of fine resin particles.

Then, filtration and washing were done in a similar manner to that of Production Example of Toner 1. When the washing was repeated four times, the electric conductivity of the filtered solution reached 150 μS/cm or lower.

Thereafter, drying was done in a similar manner to that of Production Example of Toner 1 to obtain toner particles 8. Toner 8 was prepared by external adherence in a similar manner to that of Production Example of Toner 1.

(Production Example of Toner 9)

Toner particle slurry 9 was obtained in a similar manner to that of Production Example of Toner 6, except that the aqueous dispersion 6 of fine resin particles was changed to the aqueous dispersion 9 of fine resin particles.

Then, filtration and washing were done in a similar manner to that of Production Example of Toner 1. When the washing was repeated five times, the electric conductivity of the filtered solution reached 150 μS/cm or lower.

Thereafter, drying was done in a similar manner to that of Production Example of Toner 1 to obtain toner particles 9. Toner 9 was prepared by external adherence in a similar manner to that of Production Example of Toner 1.

(Production Example of Toner 10)

Toner particle slurry 10 was obtained in a similar manner to that of Production Example of Toner 5, except that the aqueous dispersion 5 of fine resin particles was changed to the aqueous dispersion 10 of fine resin particles.

Then, filtration and washing were done in a similar manner to that of Production Example of Toner 1. When the washing was repeated five times, the electric conductivity of the filtered solution reached 150 μS/cm or lower.

Thereafter, drying was done in a similar manner to that of Production Example of Toner 1 to obtain toner particles 10.

Toner 10 was prepared by external adherence in a similar manner to that of Production Example of Toner 1.

(Production Example of Toner 11)

Toner particle slurry 11 was obtained in a similar manner to that of Production Example of Toner 5, except that the mixture solution was changed to the following composition.

| | |
|---|---|
| Aqueous dispersion 11 of fine resin particles | 222 parts by mass |
| Above-mentioned colorant disperse solution B | 50 parts by mass |
| Above-mentioned disperse solution of the releasing material | 50 parts by mass |
| Magnesium sulfate | 2 parts by mass |
| Ion-exchanged water | 778 parts by mass |

Then, filtration and washing were done in a similar manner to that of Production Example of Toner 1. When the washing was repeated five times, the electric conductivity of the filtered solution reached 150 μS/cm or lower.

Thereafter, drying was done in a similar manner to that of Production Example of Toner 1 to obtain toner particles 11. Toner 11 was prepared by external adherence in a similar manner to that of Production Example of Toner 1.

(Production Example of Toner 12)

Toner particle slurry 12 was obtained in a similar manner to that of Production Example of Toner 5, except that the aqueous dispersion 5 of fine resin particles was changed to the aqueous dispersion 12 of fine resin particles.

Then, filtration and washing were done in a similar manner to that of Production Example of Toner 1. When the washing was repeated four times, the electric conductivity of the filtered solution reached 150 μS/cm or lower.

Thereafter, drying was done in a similar manner to that of Production Example of Toner 1 to obtain toner particles 12. Toner 12 was prepared by external adherence in a similar manner to that of Production Example of Toner 1.

(Production Example of Toner 13)

Toner particle slurry 13 was obtained in a similar manner to that of Production Example of Toner 5, except that the mixture solution was changed to the following composition.

| | |
|---|---|
| Aqueous dispersion 13 of mixed fine particles of the resin and the releasing material | 204 parts by mass |
| Above-mentioned colorant disperse solution B | 50 parts by mass |
| Magnesium sulfate | 2 parts by mass |
| Ion-exchanged water | 796 parts by mass |

Then, filtration and washing were done in a similar manner to that of Production Example of Toner 1. When the washing was repeated three times, the electric conductivity of the filtered solution reached 150 μS/cm or lower.

Thereafter, drying was done in a similar manner to that of Production Example of Toner 1 to obtain toner particles 13. Toner 13 was prepared by external adherence in a similar manner to that of Production Example of Toner 1.

(Production Example of Toner 14)

Toner particle slurry 14 was obtained in a similar manner to that of Production Example of Toner 5, except that the mixture solution was changed to the following composition.

| | |
|---|---|
| Aqueous dispersion 14 of mixed fine particles of the resin and the pigment | 220 parts by mass |
| Above-mentioned disperse solution of a releasing material | 50 parts by mass |
| Magnesium sulfate | 2 parts by mass |
| Ion-exchanged water | 780 parts by mass |

Then, filtration and washing were done in a similar manner to that of Production Example of Toner 1. When the washing was repeated three times, the electric conductivity of the filtered solution reached 150 μS/cm or lower.

Thereafter, drying was done in a similar manner to that of Production Example of Toner 1 to obtain toner particles 14. Toner 14 was prepared by external adherence in a similar manner to that of Production Example of Toner 1.

(Production Example of Toner 15 (for Comparison))

Toner particle slurry 15 was obtained in a similar manner to that of Production Example of Toner 1, except that the mixture solution was changed to the following composition.

| | |
|---|---|
| Aqueous dispersion 15 of fine resin particles | 1,000 parts by mass |
| Above-mentioned colorant disperse solution B | 50 parts by mass |
| Above-mentioned disperse solution of the releasing material | 50 parts by mass |
| Magnesium sulfate | 2 parts by mass |

Then, filtration and washing were done in a similar manner to that of Production Example of Toner 1. To reach the electric conductivity of the filtered solution of 150 μS/cm or lower, the filtration and the washing were necessary to be repeated eight times.

Thereafter, drying was done in a similar manner to that of Production Example of Toner 1 to obtain toner particles 15. Toner 15 was prepared by external adherence in a similar manner to that of Production Example of Toner 1.

(Production Example of Toner 16 (for Comparison))

Toner particle slurry 16 was obtained in a similar manner to that of Production Example of Comparative Toner 15, except that the aqueous dispersion 15 of fine resin particles was changed to the aqueous dispersion 16 of fine resin particles.

Then, filtration and washing were done in a similar manner to that of Production Example of Toner 1. To reach the electric conductivity of the filtered solution of 150 μS/cm or lower, the filtration and the washing were necessary to be repeated ten times.

Thereafter, drying was done in a similar manner to that of Production Example of Toner 1 to obtain toner particles 16. Toner 16 was prepared by external adherence in a similar manner to that of Production Example of Toner 1.

Evaluation results of the above-mentioned toners 1 to 16 are shown in Table 3 and Table 4.

For image evaluation of the following, a commercially available color laser printer (LBP-5500, manufactured by Canon Inc.) converted so as to increased in a process speed by two-folds was used as an image forming instrument. A magenta cartridge of this image forming instrument was charged with the toner 1 as mentioned above, and with it, up to 5,000 sheets of paper were printed out for an image of 2%-printing ratio in an intermittent mode of two papers (a mode in which a developing instrument is stopped for 10 seconds after every two papers printing, thereby accelerating toner deterioration by pre-operation in rebooting time) at ambient temperature and humidity. The following items were evaluated for the initial print and the five-thousandth print.

(Image Density)

Using a transcription material of an ordinary copy paper (75 g/m²), a solid image was printed out at the termination of the sustainability evaluation in a print-out test and its density was measured for evaluation. Here, the image density was measured as a relative density to an image of a white part with the manuscript density being 0.00 by using Macbeth reflection densitometer RD918 (manufactured by Macbeth Co., Ltd.)

A: 1.30 or more
B: 1.20 or more and less than 1.30
C: 1.00 or more and less than 1.20

(Image Fogging)

The difference in whiteness between a white part of a printed-out image and a transcription paper was measured by REFLECTMETER MODEL TC-6DS (manufactured by Tokyo Denshoku Co., Ltd.) to obtain a fog concentration (%), with which an image fogging at the end of a sustainability test was evaluated. An amber light filter was used as the filter.

A: less than 0.5%
B: 0.5% or more and less than 1.0%
C: 1.0% or more and less than 1.5%

TABLE 3

| | Toner No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| No. of aqueous dispersion of fine rein particles | 1 | 2 | 3 | 4 | 5 | 6 | 7 | 8 | 9 | 10 | 11 | 12 | 13 | 14 |
| Number of washings for electric conductivity to reach 150 μS/cm or lower | 3 | 3 | 3 | 4 | 4 | 5 | 6 | 4 | 5 | 5 | 5 | 4 | 3 | 3 |
| Image density | A | A | A | A | A | A | A | A | B | A | A | A | A | A |
| Image fogging | A | A | A | A | A | A | B | A | B | A | A | A | A | A |

TABLE 4

| Toner No. | 15 | 16 |
|---|---|---|
| No. of aqueous dispersion of fine rein particles | 15 | 16 |
| Number of washings for electric conductivity to reach 150 μS/cm or lower | 8 | 10 |
| Image density | A | C |
| Image fogging | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-144339, filed Jun. 2, 2008, which is herein incorporated by reference as part of this application.

What is claimed is:

1. An aqueous dispersion of fine resin particles comprising fine resin particles containing an acid group-containing resin and an aqueous medium, wherein the fine resin particles are nonspherical particles with an average minor axis being 0.02 μm or more and 1.00 μm or less and an average ratio of a major axis to a minor axis being 2.0 or more and 5.0 or less, wherein a 50%-particle diameter based on volume distribution of the fine resin particles is 0.02 μm or more and 1.00 μm or less, and wherein the acid group-containing resin is a polyester resin.

2. The aqueous dispersion of fine resin particles according to claim 1, wherein the 50%-particle diameter based on volume distribution of the fine resin particles is 0.02 μm or more and 0.40 μm or less.

3. The aqueous dispersion of fine resin particles according to claim 1, wherein a softening temperature (Tm) of the acid group-containing resin is 90° C. or higher and 150° C. or lower.

4. A method for producing an aqueous dispersion of fine resin particles comprising at least (1) mixing an aqueous medium, an acid group-containing resin, a basic substance, and a surfactant to obtain a mixture, (2) emulsifying the mixture by applying a shear force with heating the mixture at a temperature of 10° C. or higher relative to a softening temperature (Tm) of the acid group-containing resin to form an emulsified mixture, and (3) cooling the emulsified mixture, wherein the cooling is done, with applying a shear force, at a cooling rate of 0.5° C./minute or faster and 10° C./minute or slower till a glass transition temperature (Tg) of the acid group-containing resin or lower, and the obtained aqueous dispersion of fine resin particles is the aqueous dispersion of fine resin particles according to claim 1.

5. The method for producing an aqueous dispersion of fine resin particles according to claim 4, wherein a mass ratio of the fine resin particles to the total mass of the aqueous medium and the fine resin particles (mass of the fine resin particles/total mass of the aqueous medium and the fine resin particles) is 0.20 or more and less than 0.60.

6. The method for producing an aqueous dispersion of fine resin particles according to claim 4, wherein the emulsification is done under conditions of 100° C. or higher and 0.11 MPa or higher.

7. A method for producing toner particles comprising at least aggregating to form aggregates by mixing at least an aqueous dispersion of fine resin particles and a colorant thereby aggregating the fine resin particles and the colorant in an aqueous medium and fusing the aggregates by heating to obtain toner particles, characterized in that the aqueous dispersion of fine resin particles is the aqueous dispersion of fine resin particles according to claim 1.

* * * * *